EMMA MILLER.
COOKING APPARATUS.

No. 186,148. Patented Jan. 9, 1877.

WITNESSES:
Frank Hirsch.
Jno. P. Stark.

INVENTRESS:
Emma Miller.
by Michael P. Stark.
Buffalo, N.Y.
her attorney.

UNITED STATES PATENT OFFICE.

EMMA MILLER, OF RANDOLPH, NEW YORK, ASSIGNOR OF ONE-HALF HER RIGHT TO A. ALONZO MILLER, OF SAME PLACE.

IMPROVEMENT IN COOKING APPARATUS.

Specification forming part of Letters Patent No. 186,148, dated January 9, 1877; application filed December 13, 1876.

*To all whom it may concern:*

Be it known that I, EMMA MILLER, of Randolph, in the county of Cattaraugus and State of New York, have invented certain new and useful Improvements on a Steam-Cooking Apparatus; and I do hereby declare that the following description of my said invention, taken in connection with the accompanying sheet of drawings, forms a full, clear, and exact specification, which will enable others skilled in the art to which it appertains to make and use the same.

My invention relates, in general, to steam-cooking apparatus; and it consists in the combination and arrangement with a lower reservoir, containing a certain amount of water to be gradually converted into steam, and provided with a perforted false bottom or grate, of one or more cooking-vessels, having tightly-fitting covers, fitted with a perforated jacket for the circulation of steam, said vessels to be inserted into the reservoir, where they are entirely surrounded by the steam generated in said reservoir, and the articles of food contained therein thoroughly cooked or baked. The reservoir is provided with a filling-tube, for refilling the apparatus without removing the cover thereof.

Figure 1:
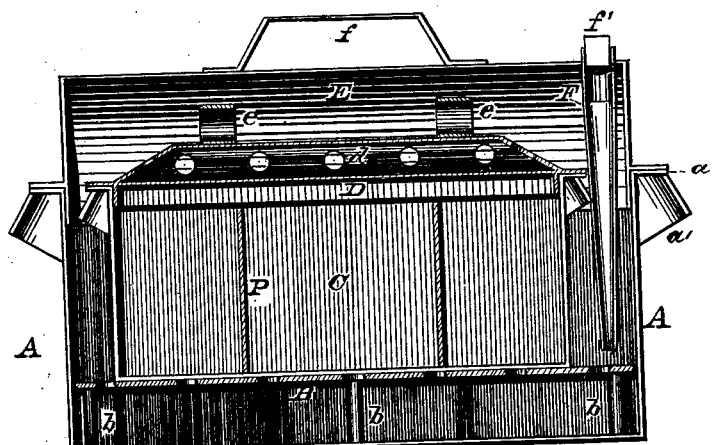
Figure 2:
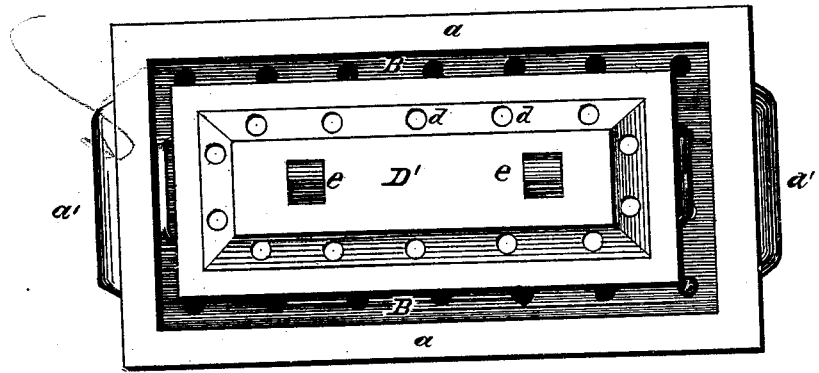

In the drawings heretofore mentioned, Figure 1 is a longitudinal sectional elevation, and Fig. 2 a plan, of my improved steam-cooking apparatus, the latter figure representing the same with the cover removed.

Similar parts are designated by corresponding letters of reference in both figures.

A is the reservoir of my cooking apparatus. It consists of either a circular or oblong shell having a strong bottom, and provided with an outwardly-projecting flange, a, on its upper edge. Within this reservoir I place a perforated false bottom or rack, B, resting upon prongs or projections b, of a length sufficient to keep said false bottom the proper distance from the bottom proper of said reservoir. Upon the false bottom B I place the cooking-vessel C, constructed in a manner similar to the vessel A, except that it is smaller in size. This cooking-vessel is provided with a cover, D, having a jacket, D', perforated with apertures d, and fitted with ears e, to handle the same. The vessel A has also a tightly-fitting cover, E, provided with a bail or ear, f, and also with a tube, F, projecting inwardly into the vessel A, to within a short distance of the false bottom B. This tube serves as a means to refill the reservoir during cooking, without necessitating the removal of its cover, and it therefore projects outside the said cover a short distance. It is closed by a suitable plug or cork, f'.

The vessel A has, furthermore, handles or ears a', similar to those of the cooking-vessel C. If desired, this latter vessel may be partitioned into two or more compartments by the wall or walls P, so that different articles of food may be cooked at the same time.

The operation of my improved steam-cooking apparatus will be readily understood from the following: The articles of food to be cooked or baked are placed into the cooking-vessel C, and this, after being covered, is inserted into the reservoir-vessel A, which has previously been filled with water to within a short distance of the perforated bottom B. Now, the cover E is put onto the vessel A, and this vessel placed upon a stove or range. The heat communicated to the water will soon commence to convert it into steam, and this, by its heating influence, cooks or bakes the contents of said cooking-vessel C.

If the cooking continues for a certain length of time it will be necessary to refill the reservoir A; and in order to do so without interfering with the cooking process, I have provided the cover E with the tube F, through which the said vessel A can be filled without removing the apparatus from the fire, or without even removing the cover E.

Some articles of food are preferably steamed by a direct application of moist heat, such as puddings, &c. These articles may be placed either into the cooking-vessel C and its cover left off, or they may be placed upon the false bottom B, and thus subjected to the action of the steam.

For canning fruit my cooking apparatus will be found especially serviceable, because the fruit can be packed in its natural state in the cans, and these placed upon the false bottom and subjected to the steam-cooking process. This mode of cooking fruit discards the usual handling of the same after it is cooked to fill the cans, and it is therefore cleaner, and the canned articles more palatable.

It will be observed that the articles of food, when placed in the covered vessel C, are under the influence of an indirect or dry heat only, and that for baking bread no better apparatus could be found, because the dough is subjected to the proper temperature, which does not vary over a few degrees, and therefore precludes the possibility of either overdoing or underdoing the same.

Bread, &c., may be done in this apparatus without the slightest trouble or inconvenience, and will always be well done.

The apparatus can be manufactured of either tin, brass, copper, or other suitable material, at a minimum cost, and it will therefore be within the reach of every housekeeper, to whom it will prove to be one of the most labor-saving and easily-managed utensils to be found about a kitchen.

Having thus fully described my invention, I desire to secure to me by Letters Patent of the United States the following:

The hereinbefore-described steam-cooking apparatus, consisting of the reservoir-vessel A, provided with the perforated false bottom B and a cover, E, of the cooking-vessel C, having the double cover D D', provided with perforations d, said cover E being fitted with the filling-tube F, and the whole constructed and arranged to operate substantially in the manner as and for the use and purpose set forth and described.

In testimony that I claim the foregoing as my invention I have hereto set my hand in the presence of two subscribing witnesses.

EMMA MILLER.

Attest:
A. A. MILLER,
E. S. MATTESON.